United States Patent [19]

Mitchell

[11] Patent Number: 4,502,104
[45] Date of Patent: Feb. 26, 1985

[54] BOOTSTRAPPED AC-DC POWER CONVERTER

[75] Inventor: Daniel M. Mitchell, Cedar Rapids, Iowa

[73] Assignee: Rockwell International Corporation, El Segundo, Calif.

[21] Appl. No.: 452,470

[22] Filed: Dec. 23, 1982

[51] Int. Cl.³ .......................................... H02M 3/335
[52] U.S. Cl. ...................................... 363/26; 363/89; 323/266
[58] Field of Search ...................................... 363/24–26, 363/86, 89, 126, 95, 97; 323/266

[56] References Cited

U.S. PATENT DOCUMENTS

| | | | |
|---|---|---|---|
| 4,030,024 | 6/1977 | Chambers et al. | 323/266 X |
| 4,035,710 | 7/1977 | Joyce | 323/266 X |
| 4,042,856 | 8/1977 | Steigerwald | 323/266 X |
| 4,251,857 | 2/1981 | Shelly | 323/266 X |

Primary Examiner—Peter S. Wong
Attorney, Agent, or Firm—Richard K. Robinson; George A. Montanye; H. Fredrick Hamann

[57] ABSTRACT

An AC-DC power converter includes a rectifying circuit for rectifying the AC signal. The AC signal is supplied to a switching mode power supply for regulation and final filtering to obtain the output DC signal. A baseline generator in series between the rectifying circuit and the switching mode power supply ensures that there is always a minimum voltage level present in the signal that is applied to the switching node power supply.

6 Claims, 10 Drawing Figures

BOOTSTRAPPED AC-DC POWER CONVERTER

BACKGROUND OF THE INVENTION

This invention relates to AC-DC power converters and, in particular, to AC-DC power converters having included therein a bootstrapped control system that prevents the input current from exceeding acceptable levels.

Conventional 50/60 Hz input power supplies are large and heavy due to the input isolation transformer and the filter for the rectified power line. One method used to reduce the size of the input isolation transformer is to use the off-line switching regulation technique, wherein the input voltage is rectified and filtered directly and then passed through a pulse width modulated inverter which includes an isolation transformer. The transformer operates at the inverter switching frequency, typically 20/50 kHz and is thus a magnitude smaller then the typical brute force type AC-DC 50/60 Hz inverter transformer. Further size reduction in the inverter components is possible using the higher switching frequencies of 200/500 kHz, made feasible by power MOSFETS. However, even at the higher kHz switching frequencies, the size of the power supply is dominated by the filter capacitor for the rectified power line.

FIG. 1 is a simplified block diagram of a prior art AC-DC power converter system 10 that utilizes the off-line switching method of regulation. A voltage source 1 provides an AC voltage signal to a full wave rectifier 3 where the AC voltage is converted to a rectified AC voltage signal. The output of the full wave rectifier is applied to a filter capacitor 5 for removal of the ripple components and to a switching mode power supply 7 where the rectified AC voltage signal is converted to a DC signal for application to a load 9 across which the voltage $V_o$ is developed and is indicated by the dimension lines 11. The input current $I_1$ to the switching mode power supply 7 is represented by the flow arrow 13. In the situation where the above-referenced circuit is used for power supplies that deliver high power, then the size of the capacitor 5 must be extremely large. Otherwise, the voltage $V_1$ across the capacitor 5 drops below acceptable levels under high current conditions.

In FIG. 2, there is a curve 15 illustrating the rectified voltage $V_1$ where there is no filter capacitor. The output voltage that is the voltage applied across the resistor 9 is designated as $V_o$ and is represented by the dash line 17. The current $I_1$ is represented by the curves 19. When the voltage $V_1$ that is on the output of the rectifier 3 approaches zero, as indicated at point 21, the current that is represented by the curve 19 approaches infinity. This, of course, is an undesirable condition for the operation of an AC-DC converter.

SUMMARY OF THE INVENTION

An AC-DC power converter includes a rectifying circuit for rectifying an AC signal. The AC signal is supplied to a switching mode power supply for regulation and final filtering to obtain the output DC signal. A baseline generator in series between the rectifying circuit and the switching mode power supply ensures that there is always a minimum voltage level present in the signal that is applied to the switching node power supply.

It is the object of the invention to provide a baseline generator that derives its energy from a switching mode power supply regulator rather than from the input power. Hence, the AC-DC power converter is called a bootstrapped AC-DC power converter.

It is another object of the invention to disclose an AC-DC converter in which the load current is sensed and used to provide energy to the baseline generator.

It is yet another object of the invention to disclose an AC-DC power converter in which an inverter is used to generate a transformer signal from the input current and this transformer signal is used to provide a minimum voltage for the baseline generator.

BRIEF DESCRIPTION OF THE DRAWINGS

In order that the invention may be readily carried into practice, a number of embodiments will now be described in detail by way of example, with reference to the accompanying drawings in which.

DETAILED DESCRIPTION OF THE PREFERRED EMBODIMENT

Figure 1:
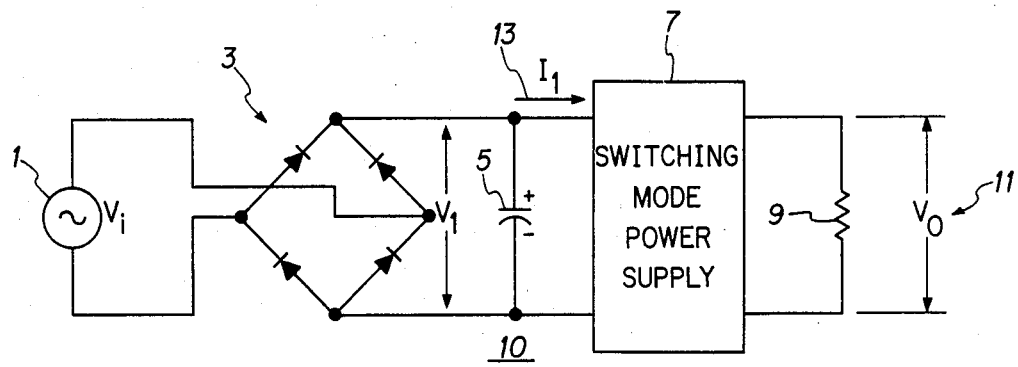
FIG. 1 is a simplified schematic diagram of the prior art AC-DC converter.
Figure 2:
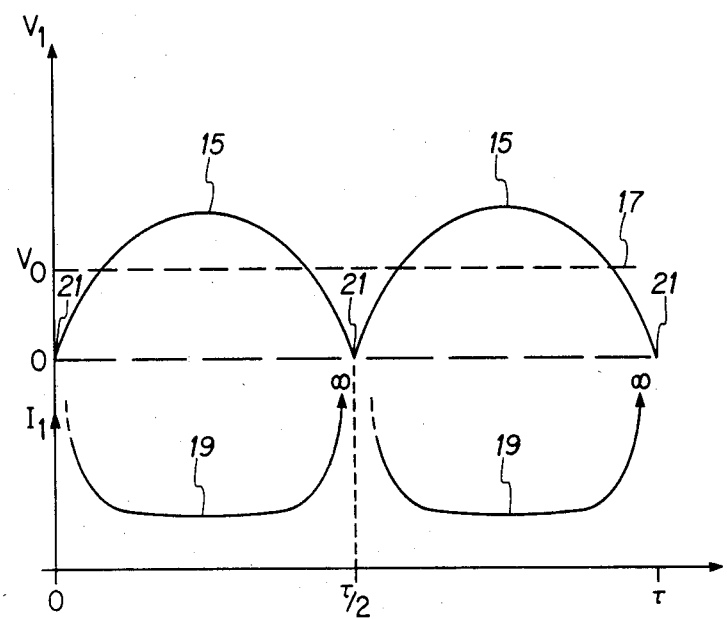
FIG. 2 is a voltage and current waveform diagram of an AC-DC converter without an input filter capacitor.
Figure 3:
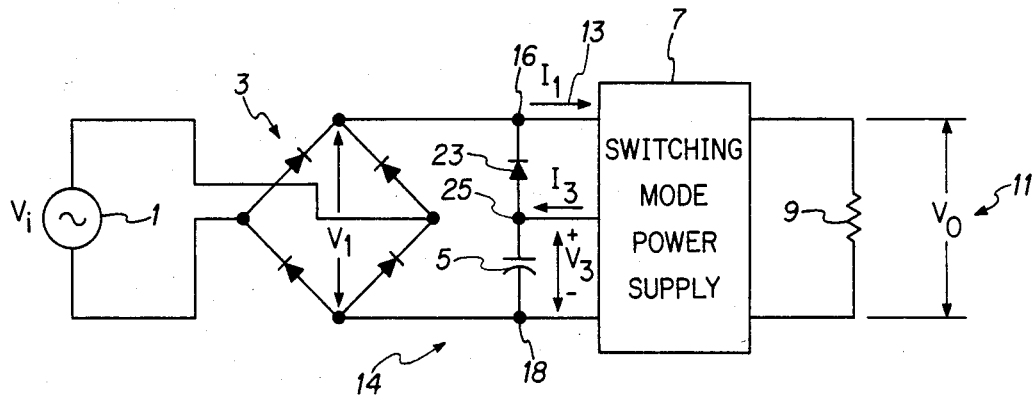
FIG. 3 is a simplified schematic diagram of an AC-DC converter according to the invention.

FIG. 3, to which reference should now be made, shows an AC-DC power converter which may be operated in either the buck mode, $V_o<V_1$, or the boost mode, $V_o>V_1$, where $V_o$ represents the output voltage and $V_1$ represents the rectified voltage. As in the case of the prior art circuit of FIG. 1, a voltage source 1 provides an alternating voltage to a rectifier 3. The rectified voltage $V_1$ is applied to the input of a switching mode power supply 7 and across a baseline generator 14 that includes a gating diode 23 and a capacitor 5. When the voltage across node points 16 and 18 drops below the voltage across the capacitor 5, shown as $V_3$, then gating diode 23 is forward biased and transfers the baseline voltage, $V_3$, across the node points 16 and 18. This minimum voltage is applied to the switching mode power supply 7 to limit the input current $I_1$ to an acceptable level. The output voltage $V_o$ is applied across the load that is represented by a resistor 9. The capacitor 5 is charged by current $I_3$ which is provided from the switching mode power supply 7, rather than directly from the input current $I_1$, having a direction represented by arrow 13. Hence, the term bootstrapped is applied to this AC-DC converter.

Figure 4:
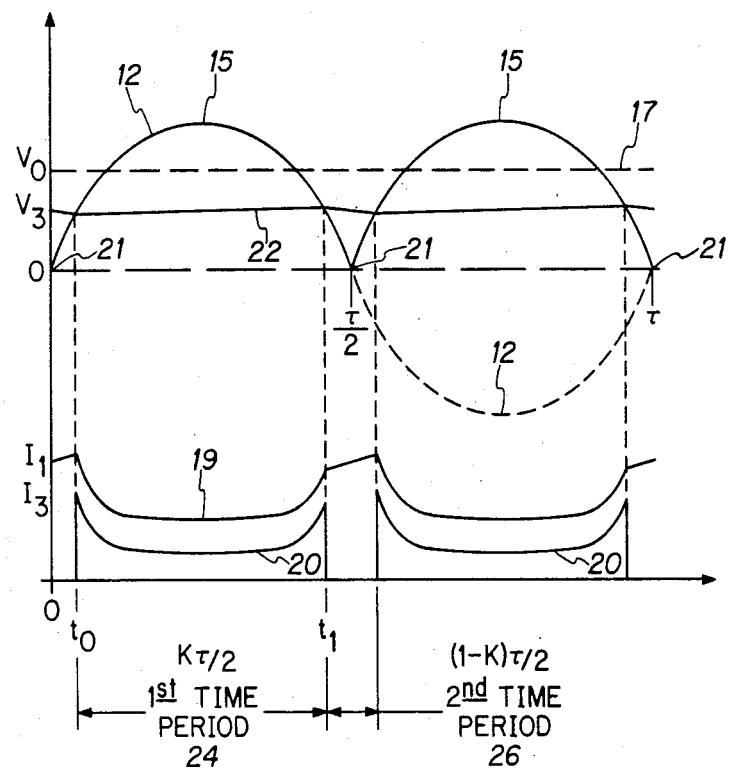
FIG. 4 is a waveform diagram of the operation of the AC-DC converter of FIG. 3.

In FIG. 4, to which reference should now be made, $I_3$ is represented by curve 20 and $I_1$ is represented by curve 19. The input voltage $V_i$ is represented by curve 12 and the rectified voltage, $V_1$, is represented by curve 15. During the first time period, as indicated by the dimension lines 24, the capacitor 5 is charged to maintain the $V_3$ voltage level that is represented by curve 22. During the second time period 26, the capacitor 5 is discharged while maintaining a base threshold voltage $V_3$ that is above the zero voltage line as indicated at point 21. The charge is taken away at this time through the gating diode 23 and ensures that the input current $I_1$ as represented by curve 19 does not approach an inordinately high level. The first time period is defined by Equation 1 by the Table of Equations, while the second time period is defined by Equation 2. Equation 3 relates $I_3$ to $I_1$.

Figure 5:
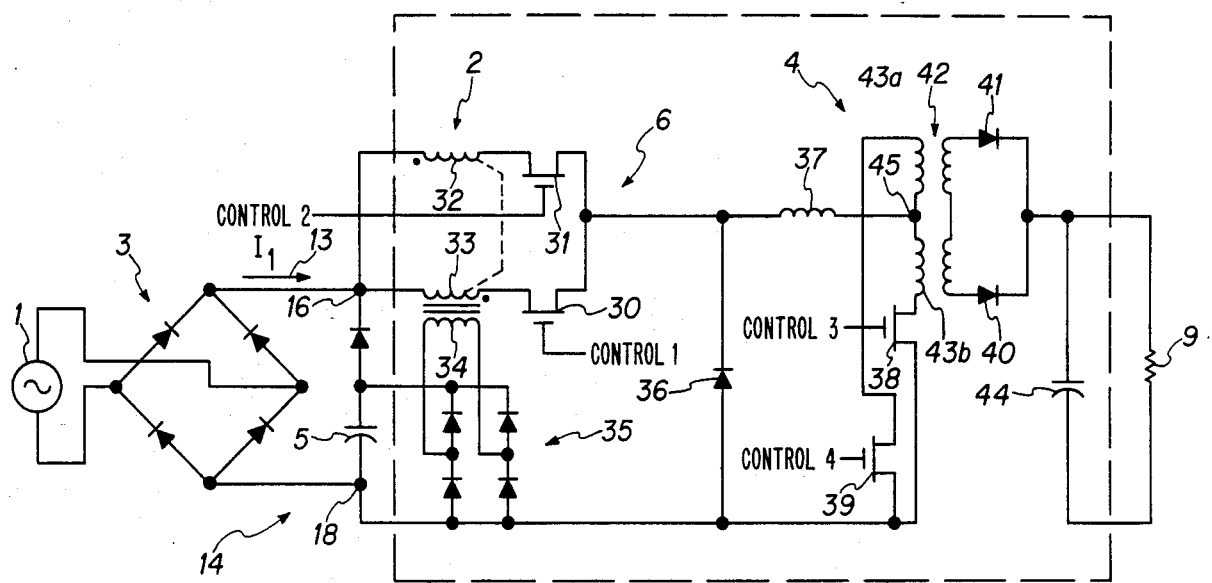
FIG. 5 is a schematic diagram of an alternate embodiment of the AC-DC converter according to the invention.

FIG. 5 is a schematic diagram of an AC-DC converter according to the invention which may be operated in both the buck and the boost modes. As was the case of FIG. 3, the rectifier 3 rectifies the AC voltage from the voltage source 1 and applies it to the switching mode power supply 7. A baseline generator 14 connected across node points 16 and 18 ensures that the voltage across the two node points does not drop below the zero volts level. The switching mode power supply 7 includes a buck switching stage 6 that is connected to a boost switching stage 4 by a choke 37 which filters the current $I_1$ that is provided from the buck switching stage 6. The buck switching stage 6 includes a first buck switching transistor 30, a second buck switching transistor 31, and a flyback diode 36. A first buck switching transistor 30 and a second buck switching transistor 31 are necessary to invert the $I_1$ into a switched current signal, so that a current transformer 2 may couple a portion of the current $I_1$ to its primary winding 34 from the secondary windings that include a first secondary winding 32 and a second secondary winding 33. The coupled current is rectified by the full wave rectifiers 35 and is converted to baseline $V_3$ voltage by the capacitor 5.

The current transformer 2 is used so that the charging current $I_3$ that is used to charge the capacitor 5 is approximately proportional, as illustrated in FIG. 4, to the input current $I_1$. The AC-DC converter of FIG. 5 is a buck boost mode power converter with the dual buck switching transistors 30 and 31 in series between the rectifier 3 and the choke 37 and as previously noted the dual buck switching transistors 30 and 31 convert the rectified signal that is present at node point 16 into a signal to which the current transformer 2 will respond. Consequently, the first buck switching transistor 30 and the second buck switching transistor 31 will, through the operation of the control signals that are present and denoted in FIG. 5 as control 1 and control 2, invert the input current $I_1$ into a square wave signal. In general, the controls 1 and 2 operate 180° apart. The buck mode operation depends upon both first buck switching transistor 30 and the second buck switching transistor 31 being off so that the buck mode duty factor is redefined as the sum of the average "on time" divided by the period of the individual buck stage transistors which includes the first buck switching transistor 30 and the second buck switching transistor 31. The first secondary winding 32 and the second secondary winding 33 of the current transformer 2 couple the chopped current $I_1$ and through the transformer action this coupled chopped current of $I_1$ is picked up by the primary winding 34 and rectified by a full wave rectifier 35. The rectified current signal is used to charge the capacitor 5 which provides a baseline voltage across the node points 16 and 18 when the gating diode 23 is forward biased.

The boost switching stage 4 includes an isolation transformer 42, a full wave rectifier section that includes the rectifiers 40 and 41 and a first boost FET transistor 38 and a second boost FET transistor 39. Isolation is provided between the load 9 and the buck switching stage 6 by use of the isolation transformer 42. Although the basic boost mode AC-DC converter has a single FET transistor connected in parallel with the output load, by dividing that transistor into two switching transistors isolation can be provided by use of the isolation transformer 42. The first boost transistor 38 and the second boost transistor 39 are controlled by control 3 and control 4 respectively. The first boost switching transistor 38 alternates with the second boost switching transistor 39 connecting node points 43a and 43b to node point 18. This causes an alternating signal to be induced in the secondary windings of of the isolation transformer 42 and rectified by the rectifiers 40 and 41, filtered by an output filter capacitor 44, and applied to the load 9.

Figure 6:
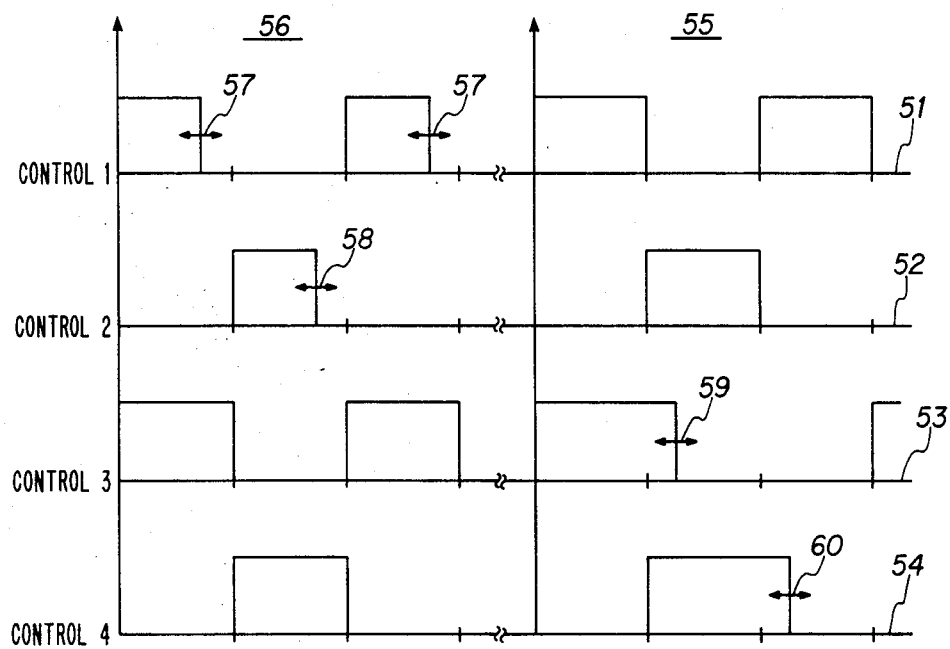
FIG. 6 is a timing diagram of the operation of the AC-DC converter of FIG. 5.

FIG. 6 is a timing diagram of control 1, control 2, control 3, and control 4, and illustrates the operation of the circuit of FIG. 5 in both the buck mode and boost mode of operation. In FIG. 6, section 56 of the timing diagram illustrates the operation of FIG. 5 in the buck mode, in which control 1 and control 2 have a varied duty factor i.e., the ratio of on-time to the complete cycle, of a maximum of 0.5. This can be varied as indicated by directional arrows 57 and 58. The minimum duty factor of the control 3 and control 4 that is represented by the curves 53 and 54, respectively, is in this stage at a minimum duty factor of 0.5. In the boost mode operation as indicated by section 55 of FIG. 6, the duty factors of control 1 and control 2 remain constant at the 0.5 duty factor whereas the duty factor of the control 3 and control 4 that is represented by waveforms 53 and 54 varies from a minimum of 0.5 forward. This is represented by arrows 59 and 60.

| TABLE OF EQUATIONS | |
| --- | --- |
| (1) | TIME PERIOD $T_1 = K\tau/2$<br>$\tau$ = period of input signal<br>$K$ = Constant |
| (2) | TIME PERIOD $T_2 = (1 - K)\tau/2$ |
| (3) | $\int_{t_0}^{t_0+K\tau/2} I_3 dt = \int_{t_1}^{t_1+(1-K)\tau/2} I_1 dt$ |

Figure 7:
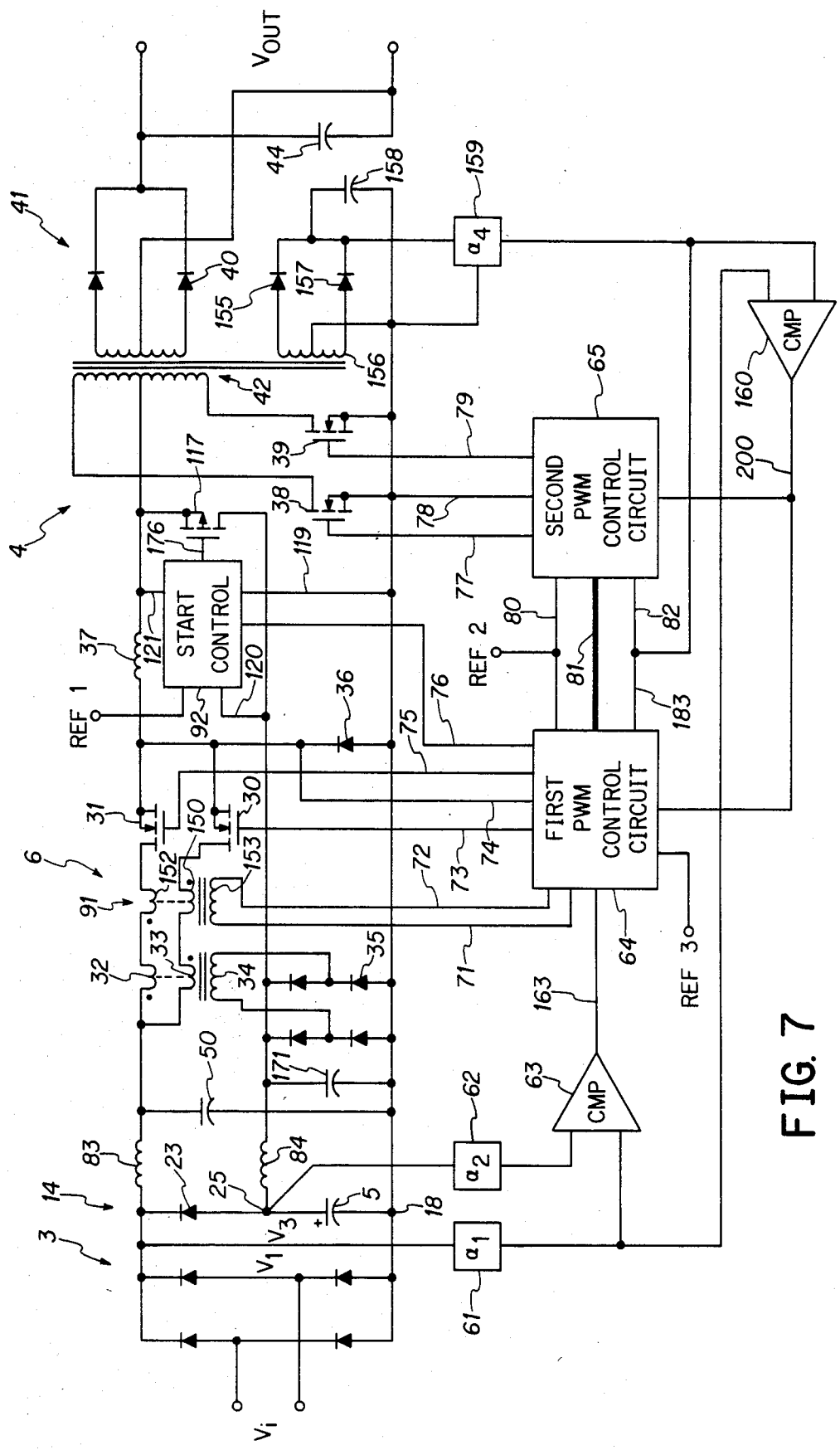
FIG. 7 is a schematic diagram of the preferred embodiment of the invention.

FIG. 7, a schematic diagram of the preferred embodiment of the invention, provides for a combination buck and boost mode AC-DC converter. $V_i$, the input voltage, is rectified by the rectifier 3 and applied to the buck switching stage 6 via a high frequency filter that includes a choke 83 and a capacitor 50. The baseline generator 14 is between the high frequency filter and the output of the full wave rectifier 3. Both $V_1$ and $V_3$ are monitored and compared by a comparator 63 and are reduced by proportional amounts as established by the $\alpha_1$ divider 61 and the $\alpha_2$ divider 62. The comparator 63 provides the result of this comparison to a first Pulse Width Modulator (PWM) control circuit 64 via conductor 163.

The signal from comparator 63 overrides the 180° operation of controls 1 and 2 in FIG. 5 and causes these controls to operate in phase instead. The advantage of this option will now be explained. During first time period 24 in FIG. 4, the actual voltage applied to the buck switching transistors 30 and 31 is not $V_1$ but rather $V_1-V_3/\alpha$ where $\alpha$ is the primary to secondary turns ratio of current transformer 2. Similarly, the voltage during second time period 26 is $V_3-V_3\alpha$. The optimum value of $\alpha$ depends upon such factors as the magnitude of $I_1$ that the switching transistors can withstand and the ripple current rating of capacitor 5. In applications where $\alpha$ is small enough that $V_3/\alpha$ cannot be neglected with respect to $V_3$, the detrimental effect of $V_3/\alpha$ can be eliminated by operating buck switching transistors 30 and 31 in phase rather than 180° out of phase. In-phase operation of transistors 30 and 31 causes the secondary voltages across windings 32 and 33 of transformer 2 to be effectively zero. In this mode, the voltage applied to transistors 30 and 31 is simply $V_1$ or $V_3$ depending upon which is greater.

Figure 10:
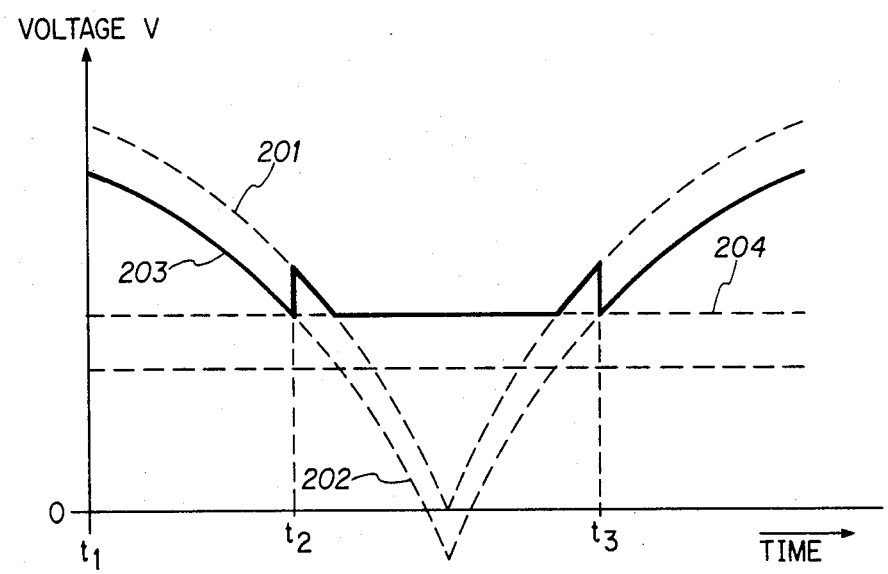
FIG. 10 is a waveform diagram of the operation of the AC-DC converter of FIG. 7.

FIG. 10 shows the voltage waveforms applied to transistors 30 and 31 in dashed lines 201 and 202, and the preferred voltage in a solid line 203. Note that from $t=t_2$ to $t=t_3$, solid line 203 corresponding to when $V_1-V_3\alpha$ is less than $V_3$, as indicated by dashed line 203, transistors 30 and 31 operate in phase in accordance with the control signal from comparator 63. In this way, the effective applied voltage to the switched node power supply is never less than the baseline generator voltage $V_3$.

As in the case of FIG. 5, the charging current $I_3$ for capacitor 5 is induced into the secondary winding 34 and rectified by the full wave rectifier 35. A high frequency filter removes any high frequency noise that is present in the circuit as a result of the switching of either the boost mode switching transistors 30 and 31 or the buck mode switching transistors 38 and 39 and includes a choke 84 and capacitor 171. Control of the first buck switching transistor 30 and the second buck switching transistor 31 is provided via conductors 73, 75 and 74 from the first PWM control circuit 64, and is generated in part via the current that is sensed in a current sense transformer 91 in primary winding 153 from secondary windings 150 and 152 and coupled to the first PWM control circuit 64 by conductors 71 and 72. The operation of the sensing of the current $I_1$ that is provided from the current sense transformer 91 limits the current that flows through the first buck switching transistor 30 and the second buck switching transistor 31 during initial startup when a high rate of current flow is provided to charge the output filter capacitor 44. The output of the buck switching stage 6 is applied as was discussed earlier to the boost switching stage 4 via the choke 37. A start control circuit 92 is provided to ensure the charging of capacitor 5 during the initial startup operation. Isolation between stages is provided by the isolation transformer 42 and the output is rectified by the rectifiers 40 and 41. An additional monitoring of the output voltage is provided by a feedback loop that includes a secondary winding 156 and diodes 155 and 157 which convert the sense voltage into a voltage analog after being filtered by the capacitor 158. The voltage analog is applied via $\alpha_4$ divider 159 to a comparator 160 which compares the output voltage with the input voltage from the $\alpha_1$ divider 61 and provides the information to the first PWM control circuit 64 and a second PWM control circuit 65. This information determines whether the switching mode power supply 7 should operate in the buck mode or the boost mode in order to maintain regulation of the output voltage. In the buck mode, the duty factors of boost switching transistors 38 and 39 are fixed at 0.5 via second PWM control circuit 65 and the duty factors of buck switching transistors 30 and 31 are controlled within the range of 0 to 0.5 via first PWM control circuit 64. In the boost mode, the duty factors of buck switching transistors 30 and 31 are fixed at 0.5 and the duty factors of boost switching transistors 38 and 39 are controlled within the range of 0.5 to 1.0 via second PWM control circuit 65. The second PWM control circuit 65 provides the control signal that controls the switching of the first boost switching transistor 38 and the second boost switching transistor 39 via conductors 77, 79 and the return conductor 78. Reference to the start control circuit 97 is provided by a reference voltage source, not shown, and denoted in FIG. 7 as reference 1. Additional references are provided and denoted as reference 2 and reference 3. These are voltages which are used in the operation of the first PWM control circuit 65 and the second PWM control circuit 64 to control the magnitudes and length of time that the control signals are being applied to the buck or boost switching transistors 30, 31, 38 or 39.

Figure 8:
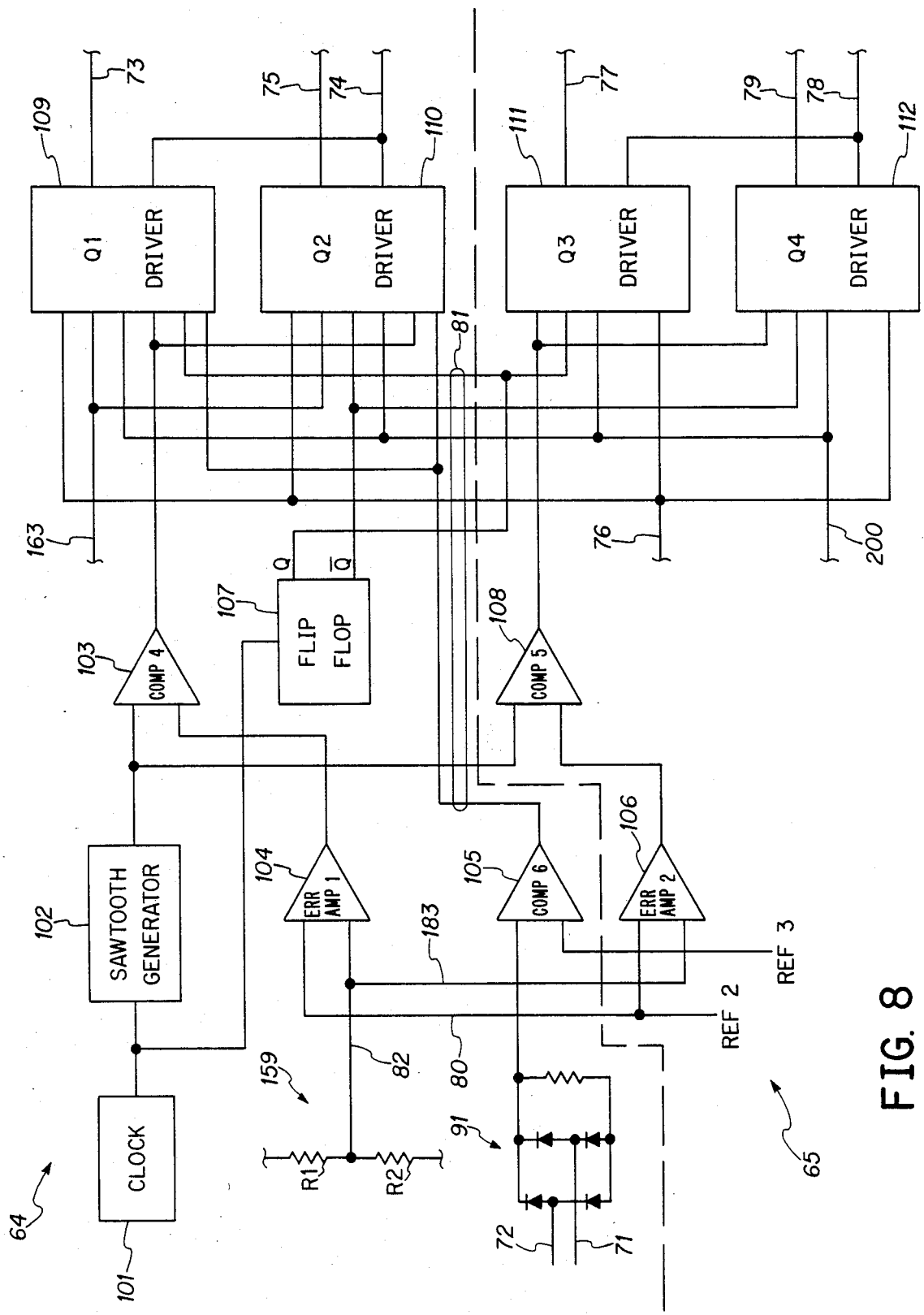
FIG. 8 is a schematic diagram of the pulse width modulation control circuits of FIG. 7.

FIG. 8 is a block diagram of the first PWM control circuit 64 and the second PWM control circuit 65. A clock source 101 provides a drive signal to a sawtooth generator 102 as well as to a flip-flop 107. The output of $\alpha_4$ (divider 159) is applied to an error amplifier 104 where a reference 2 signal is compared to the signal that is provided from $\alpha_4$ which represents the output voltage. The difference as obtained from this comparison is applied to a comparator 103. The comparator 103 compares this difference signal with an output from the sawtooth generator 102 and when the level of the signal that is provided by the error amplifier 104 exceeds the voltage level of the sawtooth signal, the first control FET driver 109 and the second control FET driver 110 will turn off during the period of time that the amplitude from the error amplifier 104 exceeds the sawtooth signal that is provided by the sawtooth generator 102. The outputs from flip-flop 107 ensures that the first control FET driver 109 and the second control FET driver 110 are never on at the same time regardless of the output from the comparator 103.

Comparator 108, which is contained within the second PWM control circuit 64 compares the output from the sawtooth generator 102 with the output of the error amplifier 106 which again compares the output of the $\alpha_4$ divider 159 with the second reference signal to provide a difference signal to the comparator 108. Comparator 108 provides an enable signal to the third control FET driver 111 and the second control FET driver 112 which will cause, depending upon the state of the signal from the flip-flop 107, the first boost switching transistor 38 and the second boost switching transistor 39 to conduct anytime the amplitude of the output from the error amplifier 106 exceeds the voltage level of the sawtooth signal that is provided by the sawtooth generator 102. Comparator 105 compares the output that is provided from the current sense transformer 91 with a third reference signal which provides current limiting to the first control FET driver 109 and the second control FET driver 110. Although the circuit is given in a basic block diagram, it may be the type of circuits disclosed in my U.S. Pat. No. 4,244,016 which describes the operation of a pulse width modulation circuit.

Figure 9:
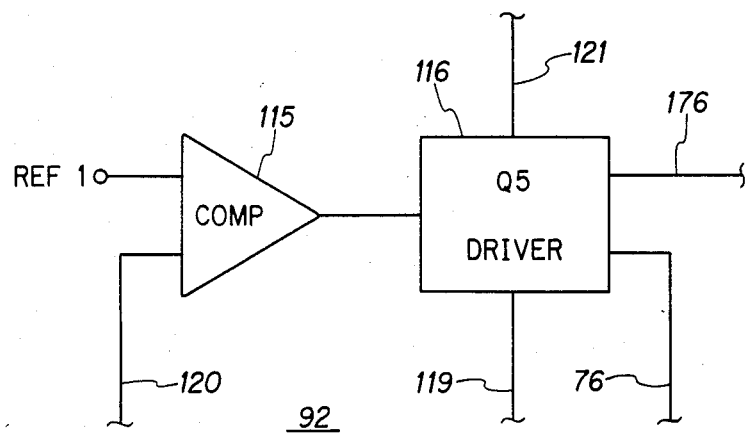
FIG. 9 is a schematic diagram of the start control circuit of FIG. 7.

At initial turn-on the start control circuit 92 causes the capacitor 5 to charge up prior to current being provided to the output filter capacitor 44. This is illustrated in FIG. 9 to which reference should now be made. At initial startup bias is provided to the start control circuit 92 via the conductor 121 which causes the driver 116 to apply a forward biasing to the FET switch 117 of FIG. 7. The FET switch 117 connects the current that is flowing through choke 37 to capacitor 5 to develop a starting baseline voltage. The voltage across capacitor 5 is applied to a comparator 115 via choke 84 and conductor 120 where a comparison is made between it and a reference 1 signal. When the current charges capacitor 5 to a level that exceeds a voltage level that is denoted reference 1, the driver 116 will force the FET switch 117 to turn off thereby applying the current to the isolation transformer 42.

Although the present invention has been described with respect to a particular embodiment thereof, it is not to be so limited as changes might be made therein which fall within the invention as defined in the appended claims.

I claim:

1. An AC to DC power converter, comprising:
   means for providing a rectified voltage of an alternating current signal at an output;
   means coupled to regulate voltage at said output for providing a regulated direct current voltage; and
   means coupled to said output for providing a predetermined direct current voltage level and responsive to said rectified voltage for maintaining voltage at said output at said predetermined direct current voltage level.

2. The converter according to claim 1 wherein said means coupled to said output comprises:
   means coupled to derive current from said rectified voltage and produce a source of voltage in response to that current; and
   means responsive to said rectified voltage for providing a predetermined voltage from said source of voltage to said output when said rectified voltage is less than said predetermined voltage.

3. The converter of claim 1 wherein said means coupled to said output includes a capacitor serially coupled to a diode between two terminals defining said output.

4. The converter of claim 3 wherein said means coupled to regulate includes means for charging said capacitor with a voltage.

5. The converter of claim 4 wherein said means for charging said capacitor comprises a transformer having a first winding coupled to receive current from said output and a second winding coupled to produce said voltage for charging said capacitor in response to current flow in said first winding.

6. The converter of claim 1 wherein said means coupled to regulate includes two switching transistors and means for controlling said switching transistors to switch at 180° with respect to one another when said rectified voltage is greater than said predetermined direct current voltage level, and to switch in phase with one another when said rectified voltage is less than said predetermined direct current voltage level.

* * * * *